(12) United States Patent
Ben-Ari et al.

(10) Patent No.: US 12,412,394 B2
(45) Date of Patent: Sep. 9, 2025

(54) ACTION RECOGNITION USING LIMITED DATA

(71) Applicant: International Business Machines Corporation, Armonk, NY (US)

(72) Inventors: Rami Ben-Ari, Kiryat-Ono (IL); Ophir Azulai, Tivon (IL); Udi Barzelay, Haifa (IL); Mor Shpigel Nacson, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 17/219,322

(22) Filed: Mar. 31, 2021

(65) Prior Publication Data

US 2022/0318555 A1    Oct. 6, 2022

(51) Int. Cl.
*G06V 20/40* (2022.01)
*G06F 18/22* (2023.01)
*G06N 3/04* (2023.01)
*G06N 3/063* (2023.01)
(Continued)

(52) U.S. Cl.
CPC .............. *G06V 20/46* (2022.01); *G06F 18/22* (2023.01); *G06N 3/04* (2013.01); *G06N 3/063* (2013.01); *G06N 3/08* (2013.01); *G06V 10/82* (2022.01)

(58) Field of Classification Search
CPC ...... G06V 20/46; G06V 10/82; G06V 10/454; G06V 10/778; G06V 20/42; G06F 18/22; G06N 3/04; G06N 3/063; G06N 3/08; G06N 3/045; G06N 3/096
See application file for complete search history.

(56) References Cited

U.S. PATENT DOCUMENTS 10,713,815 B1 *   7/2020   Kim .................. G06V 20/56
2015/0363644 A1 * 12/2015   Wnuk ................. G06F 16/2228
                                                     382/103
2019/0065492 A1    2/2019   Cheng
(Continued)

FOREIGN PATENT DOCUMENTS

CN            111126218 A       5/2020

OTHER PUBLICATIONS

Bo et al., "Few-Shot Learning of Video Action Recognition Only Based on Video Contents", Published in: 2020 IEEE Winter Conference on Applications of Computer Vision (WACV), Date of Conference: Mar. 1-5, 2020 Date Added to IEEE Xplore: May 14, 2020, DOI: 10.1109/WAC, 10 pages.
(Continued)

*Primary Examiner* — Nay A Maung
*Assistant Examiner* — Dustin Bilodeau
(74) *Attorney, Agent, or Firm* — Yee & Associates, P.C.

(57) ABSTRACT

Approaches presented herein enable action recognition. More specifically, a plurality of video segments having one or more action representations is received. One or more sub-action representations in the plurality of video segments are learned. An embedding in a space of a distance metric learning (DML) network for each of the one or more sub-action representations is determined. A set of respective trajectory distances between each of the one or more sub-action representations and one or more class representatives in the space of the DML network based on the embedding is computed, and the one or more action representations based on the set of respective trajectory distances are classified.

20 Claims, 6 Drawing Sheets

(51) Int. Cl.
*G06N 3/08* (2023.01)
*G06V 10/82* (2022.01)

(56) References Cited

U.S. PATENT DOCUMENTS

| | | | |
|---|---|---|---|
| 2019/0156210 A1* | 5/2019 | He | G06N 3/045 |
| 2021/0357687 A1* | 11/2021 | Gao | G06V 20/20 |
| 2022/0156587 A1* | 5/2022 | Ebrahimpour | G06N 3/08 |
| 2023/0087526 A1* | 3/2023 | Huang | G06V 20/30 |
| | | | 382/156 |
| 2023/0367996 A1* | 11/2023 | Ajay | G06N 3/092 |

OTHER PUBLICATIONS

Estevam et al., "Zero-Shot Action Recognition in Videos: A Survey", Federal Institute of Paraná, Irati-PR, 84500-000, Brazil, arXiv:1909.06423v1 [cs.CV] Sep. 13, 2019, 16 pages.

* cited by examiner

ACTION RECOGNITION USING LIMITED DATA

TECHNICAL FIELD

The present invention relates generally to computer vision action recognition using limited data and, more specifically, to action recognition in video datasets using Few-Shot Learning (FSL) to train a machine learning model.

BACKGROUND

Action recognition is a fundamental problem in computer vision with applications including video navigation, event detection, retrieval, and human-robot collaboration. This problem can be generally divided into two main tasks. The first task is video classification that aims to classify the type of action that occurred in a short video, usually a few seconds long and referred to as a trimmed video. The second, more challenging task is temporal action detection. In this setting, given a video that can last several minutes, the goal is to detect segments where an action takes place and classify that action. These longer videos are referred to as untrimmed videos.

SUMMARY

Approaches presented herein enable action recognition. More specifically, a plurality of video segments having one or more action representations is received. One or more sub-action representations in the plurality of video segments are learned. An embedding in a space of a distance metric learning (DML) network for each of the one or more sub-action representations is determined. A set of respective trajectory distances between each of the one or more sub-action representations and one or more class representatives in the space of the DML network based on the embedding is computed, and the one or more action representations based on the set of respective trajectory distances are classified.

One aspect of the present invention includes a computer-implemented method for action recognition, the method comprising: receiving a plurality of video segments having one or more action representations, learning one or more sub-action representations in the plurality of video segments, determining an embedding in a space of a distance metric learning (DML) network for each of the one or more sub-action representations, computing a set of respective trajectory distances between each of the one or more sub-action representations and one or more class representatives in the space of the DML network based on the embedding, and classifying the one or more action representations based on the set of respective trajectory distances.

Another aspect of the present invention includes a computer system for action recognition, the computer system comprising: a memory medium comprising program instructions, a bus coupled to the memory medium, and a processor, for executing the program instructions, coupled to an action recognition engine via the bus that when executing the program instructions causes the system to: receive a plurality of video segments having one or more action representations, learn one or more sub-action representations in the plurality of video segments, determine an embedding in a space of a distance metric learning (DML) network for each of the one or more sub-action representations, compute a set of respective trajectory distances between each of the one or more sub-action representations and one or more class representatives in the space of the DML network based on the embedding, and classify the one or more action representations based on the set of respective trajectory distances.

Yet another aspect of the present invention includes a computer program product for action recognition, the computer program product comprising a computer readable hardware storage device, and program instructions stored on the computer readable hardware storage device, to: receive a plurality of video segments having one or more action representations, learn one or more sub-action representations in the plurality of video segments, determine an embedding in a space of a distance metric learning (DML) network for each of the one or more sub-action representations, compute a set of respective trajectory distances between each of the one or more sub-action representations and one or more class representatives in the space of the DML network based on the embedding, and classify the one or more action representations based on the set of respective trajectory distances.

Still yet, any of the components of the present invention could be deployed, managed, serviced, etc., by a service provider who offers to implement action recognition in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
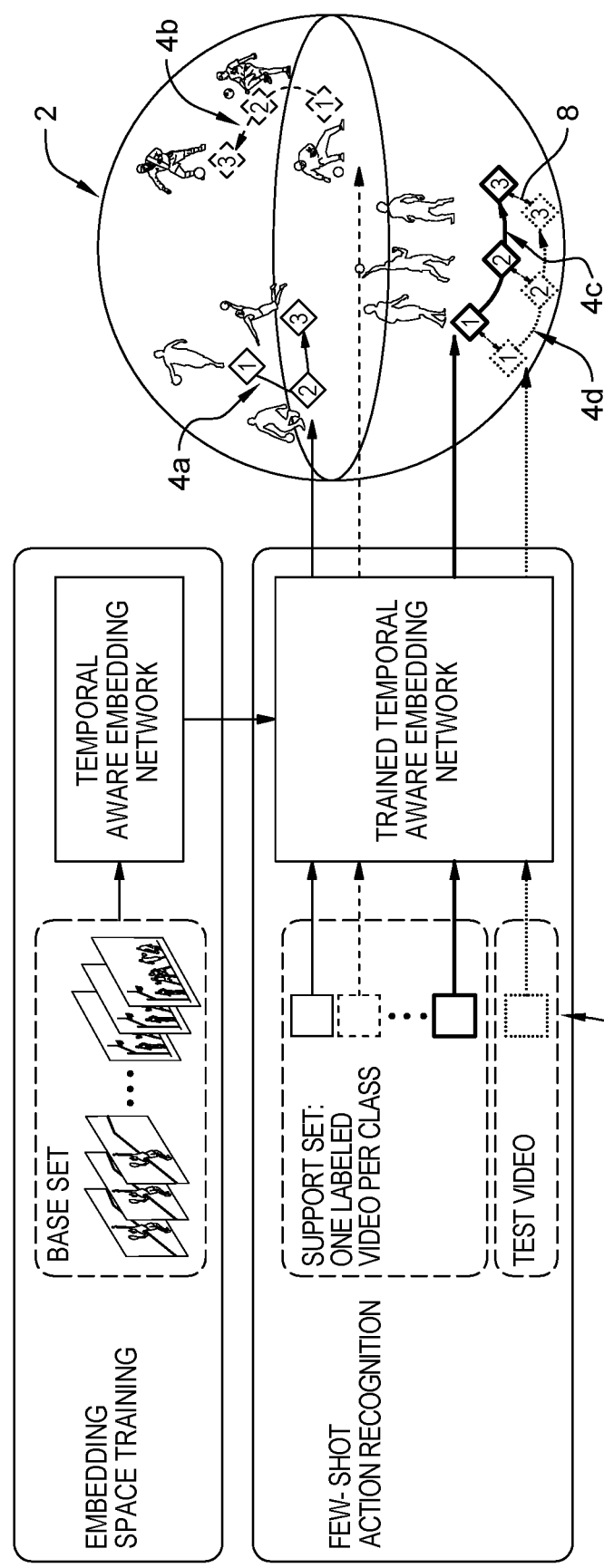
FIG. 1 shows action representation as one or more trajectories on a hypersphere embedding space according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for action recognition. More specifically, a plurality of video segments having one or more action representations is received. One or more sub-action representations in the plurality of video segments are learned. An embedding in a space of a distance metric learning (DML) network for each of the one or more sub-action representations is determined. A set of respective trajectory distances between each of the one or more sub-action representations and one or more class representatives in the space of the DML network based on the embedding is computed, and the one or more action representations based on the set of respective trajectory distances are classified.

The inventors of the embodiments described herein have found that, as in many fields in computer vision, deep learning models have also been successfully utilized for action recognition. Although these models obtain remarkable results, they require large amounts of labeled training data. Therefore, learning a new action class requires the manual collection and annotation of hundreds of sample videos which becomes costly and difficult to manage. There are also cases of rare events where limited-data samples is inherent in the task. Although weakly supervised strategies alleviate the labor of annotating videos, it still requires a large amount of weakly labeled data with high diversity. Therefore, there is an increasing demand for strategies that can learn new categories from just a few video examples. The task of learning new categories from a small number of labeled examples is known as "few-shot learning". Typical few shot learning methods are based on meta-learning, distance metric learning, and synthesis methods.

In practice, in the few shot setting, a model is trained on a so-called base set, usually in moderate size, in a way that makes it capable of classifying new unseen classes from just a few samples, often one to five. During an evaluation, there are usually k labeled examples, namely k-shots from n unseen classes, known as an n-way. This n×k sample set constitutes the so-called "support set". The task is classification of a query sample belonging to one of the classes in the support set (one of the n classes). Each iteration in which we are given n×k support set videos and a query video is called an episode.

Action recognition in videos has advanced due to the introduction of features such as dense trajectories, deep features, and the two-stream networks, convolutional 3D features for action and activity recognition (C3D) data and inflated 3D convolutional neural network (I3D) data. Prior to the availability of deep features, action recognition was handled by extracting spatial-temporal local descriptors from space-time interest points (iDTF) and drawing trajectories in pixel-time space. The sparse patterns of trajectories were analyzed to distinguish between different actions. However, these trajectories do not convey the semantic information gained in deep representations such as two-stream networks, C3D or I3D. In contrast, common deep features miss the long-term trajectories involved with complex actions, by processing short video segments (usually 16 consecutive frames). Therefore, sub-action decomposition was suggested as a solution, improving action recognition and detection in videos. Sub-actions are short temporal segments of a "long" action in video. In the instant application, sub-actions are defined as consecutive temporal segments of an action. Sub-actions do not appear to have previously been used in the setting of few-shot action detection. In contrast, the methods described herein build upon the idea of using sub-actions and their temporal order, as a strong discriminator of an action class that allows recognition of a new action class from only a few examples, typically one per class.

Referring now to FIG. 1, action representations as trajectories are shown on hypersphere 2. An embedding space is trained where actions are decomposed to sub-actions and distinguished by their trajectory, for example trajectories 4a-4d, in the feature space. This representation carries both semantics, fine-grain temporal representation, and temporal order in a coarse granularity. Using the trained embedding network, n videos from different classes (n-way, 1-shot scenario) are embedded, for example, as trajectories 4a-4c, and query test video 6 is embedded as trajectory 4d. Each of the trajectories 4a-4d shown in FIG. 1 include three sub-actions numbered 1, 2, and 3, however any number of sub-actions may be included in a trajectory. An average distance may be computed between sub-action 1 of trajectory 4c and sub-action 1 of trajectory 4d, sub-action 2 of trajectory 4c and sub-action 2 of trajectory 4d, and sub-action 3 of trajectory 4c and sub-action 3 of trajectory 4d. To further clarify, the distance between sub-action 3 of trajectory 4c and sub-action 3 of trajectory 4d is shown by bi-directional arrow 8. The query test video may then be classified based on the computed average distance between the respective sub-actions of the trajectories 4c and 4d.

While few-shot learning has been extensively studied in the context of visual recognition, few examinations in this technical area have addressed the challenges of learning from a few instances to detect spatio-temporal patterns, such as actions in videos. In particular, only a few approaches have been proposed for few-shot learning in action recognition, particularly, for video classification and temporal action detection. The approach described herein addresses, among other things, the tasks of few-shot learning for both video classification and temporal action detection. Specifically, in a few-shot action detection task, given only one or a just few examples of a set of new action classes, typically one per class, an objective of this approach is detecting substantially all occurrences of each class in an untrimmed video, based on metric learning of sub-actions in video.

An approach based on Distance Metric Learning (DML) for few-shot action recognition is described herein, and with reference to FIG. 1. An embedding space is trained that can represent reliably long-term sub-action connectivities with action categories described by a set of ordered sub-actions. The actions are then represented, for example, by the "directed" trajectories in the embedding space. This approach preserves the temporal order of sub-actions while carrying the semantics encoded in deep features. For example, two actions may occur in the same scene of a video with the same beginning and ending, but different intermediate parts will have different trajectories due to different appearance and motion. Thus, using the trajectory distance enables this approach to better distinguish between fine-grained actions, i.e., between visually similar actions that differ only in some intermediate part (namely, sub-action), and in a few-shot scenario where only one or a few training examples are available. The approach described herein is effective for both few-shot video classification and temporal action detection.

Accordingly, the inventors of the approach described herein have developed a metric learning method that encodes long term sub-action connectivity into an embedding space, eventually representing the actions as trajectories in the feature space. Another feature of this approach includes a novel loss function that allows an effective learning of class action trajectories, which incorporates a diversity loss and sub-action discrimination loss. Yet another feature of this approach is that it is computationally efficient, as the approach relies on training only a few fully connected layers (excluding the backbone) and achieves state-of-the-art result in the Kinetics few-shot benchmark. Yet another feature of this approach is that superior results with respect to temporal action detection are achieved.

Figure 2:
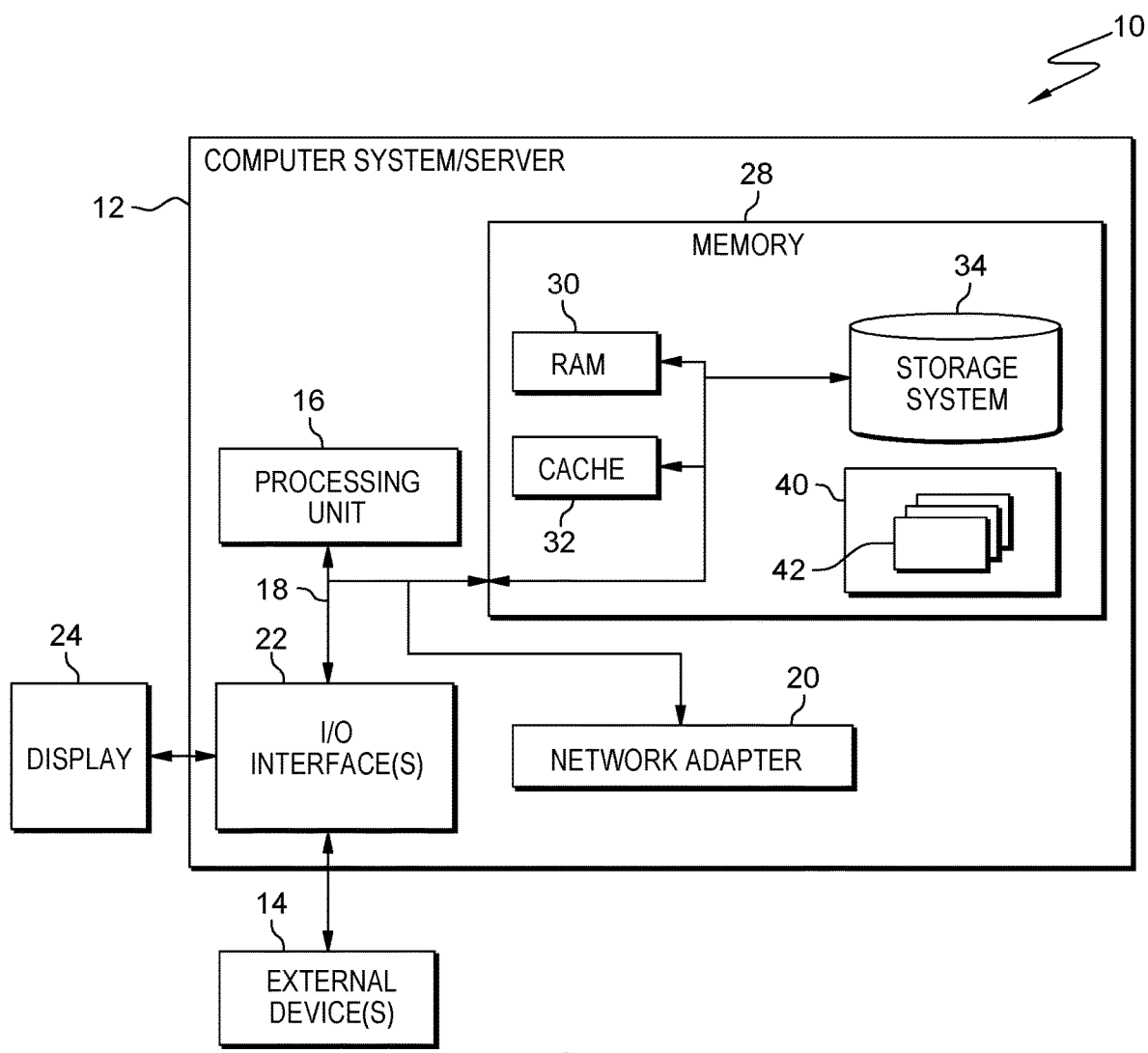
FIG. 2 shows an architecture in which the invention may be implemented according to illustrative embodiments.

Referring now to FIG. 2, a computerized implementation 10 of an embodiment for action recognition will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other (e.g., special purpose) computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for action recognition. It should be understood that any other computers implemented under the present invention may have different components/software, but can perform similar functions.

Computer system/server 12 in computerized implementation 10 is shown in the form of a computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for action recognition, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 3:
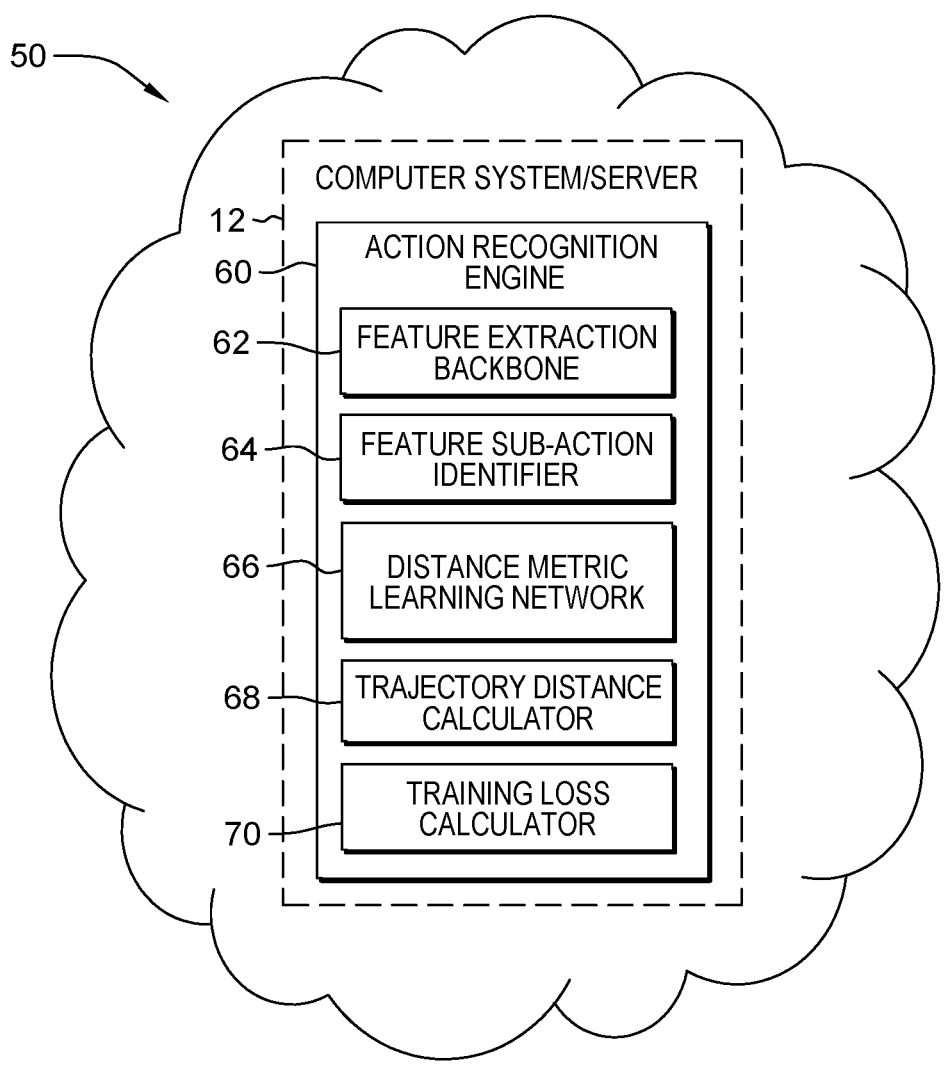
FIG. 3 shows a system diagram describing the functionality discussed herein according to illustrative embodiments.

Referring now to FIG. 3, a system diagram describing the functionality discussed herein according to an embodiment of the present invention is shown. It is understood that the teachings recited herein may be practiced within any type of computing environment, including, but not limited to, a networked computing environment (e.g., a cloud computing environment 50). A stand-alone computer system/server 12 is shown in FIG. 3 for illustrative purposes only. In the event the teachings recited herein are practiced in a networked computing environment, each client need not have an action recognition engine 60 (hereinafter "system 60"). Rather, all or part of system 60 could be loaded on a server or server-capable device that communicates (e.g., wirelessly) with the clients to provide for action recognition. Regardless, as depicted, system 60 is shown within computer system/server 12. In general, system 60 can be implemented as program/utility 40 on computer system 12 of FIG. 2 and can enable the functions recited herein.

Along these lines, system 60 may perform multiple functions. Specifically, among other functions, system 60 can recognize action in a networked computing environment. To accomplish this, system 60 can include a set of components (e.g., program modules 42 of FIG. 2) for carrying out embodiments of the present invention. These components can include, but are not limited to, feature extraction backbone 62, feature sub-action identifier 64, distance metric learning network 66, trajectory distance calculator 68, and training loss calculator 70.

Figure 4:
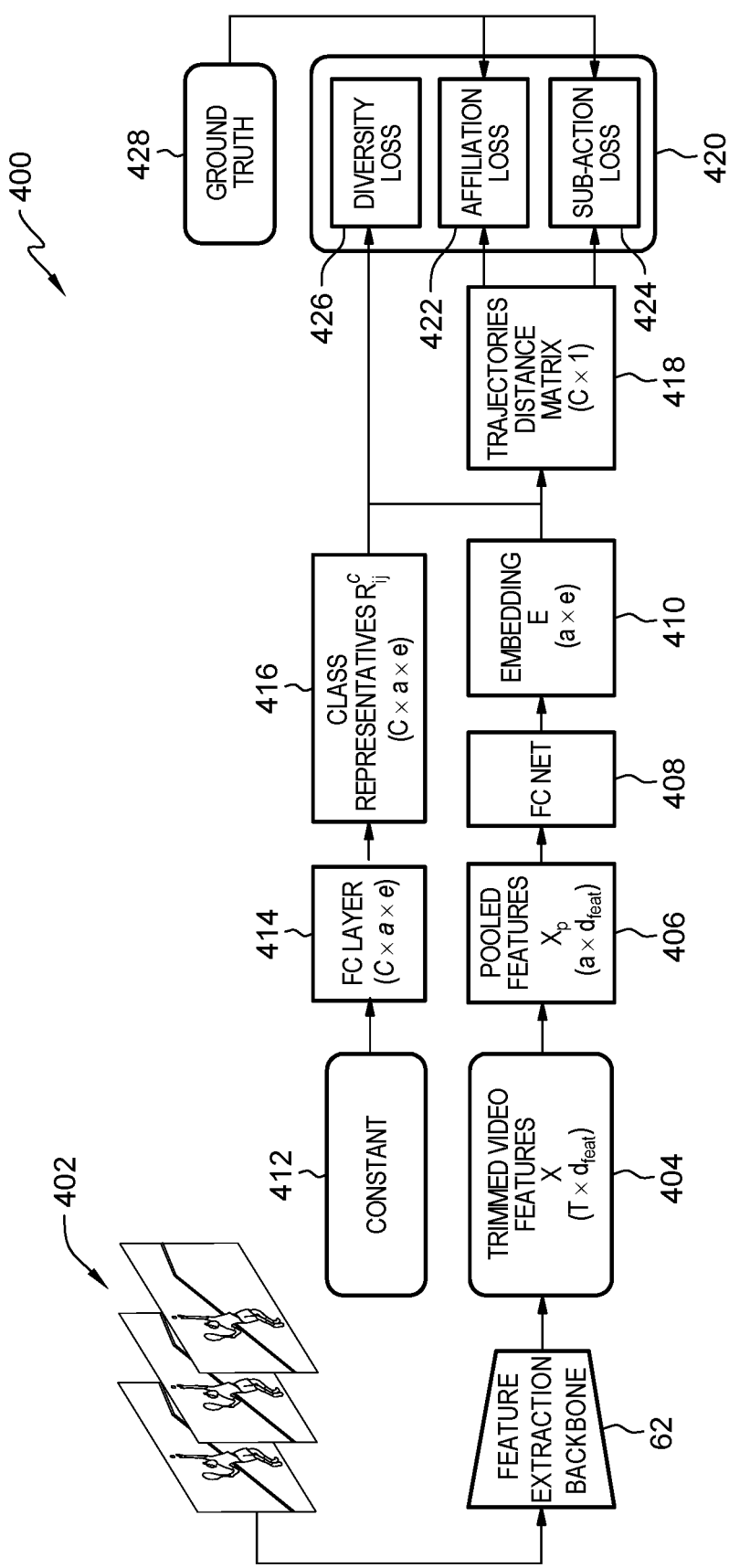
FIG. 4 shows a temporal aware embedding network method according to illustrative embodiments.

Referring now to FIG. 4 in connection with FIG. 3, Temporal Aware Embedding Network (TAEN) method 400 for few-shot action recognition is depicted. In an embodiment, TAEN method 400 is computationally light weight and requires training only a few fully connected layers. In a further embodiment, TAEN method 400 is based on temporal order of sub-actions. In yet a further embodiment, an action score is computed based on a similarity between trajectories in a feature space. The sub-actions function as building blocks of an action class and are used to determine a unique trajectory for different action categories, and such coarse granularities are actually essential for high performance. In yet a further embodiment, TAEN method 400 may utilize a diversity loss to prevent trajectories being collapsed into a single point which can be encountered in embeddings of sub-actions.

TAEN method 400 may train one or more models to generalize to new, unseen classes, which comprises at least the following steps: learning an embedding space where actions are represented by well separated trajectories, wherein action trajectories are represented by a temporally ordered centers for each sub-action, and classifying new videos according to their trajectory distance from each action representation.

Under TAEN method 400, training data 402, in one example C3D and I3D data, is used to train feature extraction backbone 62 that computes or calculates video feature matrix 404, $X \in R^{T \times d_{feat}}$, where T is the number of video segments, and $d_{feat}$ is a dimension of the backbone output features. Feature sub-action identifier 64 (shown in FIG. 3) uses average pooling to obtain pooled features 406, $X_p \in R^{a \times d_{feat}}$. A video is divided into a segments and an average feature vector is computed or calculated for each segment, where a represents the number of sub-actions. $X_p$ is used as an input to the distance metric learning (DML) network 66 (shown in FIG. 3), comprising a plurality of fully connected (FC) layers of FC net 408 with rectified linear unit (ReLU) activation functions. The embedding network output 410 is defined as $E \in R^{a \times e}$, where e is the embedding space features dimension, and $e \leq d_{feat}$.

Joint training of multiple sub-actions may be performed by computing, calculating, or producing sub-action representative centers, also known as sub-action centeroids, for each action class. In one embodiment, one or more sub-action representative centers are jointly learned with sub-action representations as described herein below. Representative centers may be computed, calculated, or produced by using constant scalar value 412 as an input to FC layer 414 with C×a×e as parameters, where C is a number of available action classes in a training set. The representative centers may be computed or calculated by reshaping output from FC layer 414 into C class representatives 416, i.e. one for each class, denoted by $R^c \in R^{a \times e}$, $\forall c=1, \ldots, C$.

Trajectories distance matrix 418, $d_t(E, R^c)$, $\forall c=1, \ldots, C$, may be computed or calculated by trajectory distance calculator 68 (shown in FIG. 3) based on differences between embedding network output 410 and class representatives 416. Computing or calculating distance or dis-similarity between trajectories may be performed by assuming two parametrized contours and measuring an average distance between corresponding parameter points between the contours. Accordingly, the trajectory distance between embedding network output 410 and a specific class representation $R^c$ of class representatives 416 may be computed or calculated as the average distance between corresponding sub-action centers (as shown in FIG. 1), and more specifically, according to Equation (1) below:

$$\forall c = 1, \ldots, C: d_t(E, R^c) = \frac{1}{a}\sum_{k=1}^{a} d(E_k, R_k^c), \quad (1)$$

wherein $E_k$ is the $k^{th}$ row of the embedding matrix E and d (., .) is a vector distance metric, for example, Euclidean or cosine distance. As shown in FIG. 1, for the distance metric d (., .), the cosine distance over a hypersphere is used, namely unit normalized embedding vector E and the representative centers $R^c \in R^{a \times e}$, $\forall c=1, \ldots, C$.

Training loss 420 may be computed or calculated by training loss calculator 70 (shown in FIG. 3) using class representatives 416 and trajectories distance matrix 418. Training loss 420 is comprised of at least: affiliation loss 422, sub-action loss 424, and diversity loss 426, as described hereinbelow.

For a given embedding video $E \in R^{a \times e}$, affiliation loss 422 minimizes a distance of embedding sub-actions from their associated centers, i.e. a distance of $E_k$ from class sub-action representative centers, wherein $E_k$ is the $k^{th}$ row of the embedding matrix E that represents an embedding of an $i^{th}$ sub-action. Affiliation loss 422 may be computed or calculated according to Equation (2) below:

$$\mathcal{L}_{aff} = \sum_{k=1}^{a} d(E_k, R_k^c), \quad (2)$$

where c is a class index and $R_k^c$ denotes a representative center of a $k^{th}$ sub-action of class c.

Sub-action loss 424 encourages discrimination between sub-actions from different action classes. Improved separation between trajectories on a hypersphere, for example hypersphere 2 (shown in FIG. 1), may be realized if a closest pair of points between trajectory sub-action representatives are far apart. Therefore, for an embedding $E \in R^{a \times e}$, sub-action loss 424 provides at least a distance margin between $E_k$ from a representative center of one class and the distance between $E_k$ to a closest center from other classes. Sub-action loss 424 may be computed or calculated according to Equation (3) below:

$$\mathcal{L}_{sub} = \frac{1}{a}\sum_{k=1}^{a} \left| d(E_k, R_k^c) - \min_{i, j \neq c} d(E_k, R_i^j) + \alpha \right|_+, \quad (3)$$

where c is a class index. Trajectory loss can be viewed as an extension of triplet loss for trajectories.

Diversity loss 426 mitigates and prevents different sub-action representatives in each class from potentially collapsing into a single point in an embedding space. Short trajectories determined by close intermediate points are less robust than longer trajectories. To avoid such a potential collapse, a diversity loss on corresponding sub-actions is introduced. Diversity loss 426 provides that sub-action representatives which are learned for each class are sufficiently differentiated from each other. This differentiation is achieved by penalizing large correlations between different sub-action representatives. Diversity loss 426 may be computed or calculated according to Equation (4) below:

$$\mathcal{L}_{div} = \sum_{c=1}^{C} \sum_{i=1}^{a} \sum_{\substack{j=1 \\ j \neq i}}^{a} \langle R_i^c, R_j^c \rangle, \quad (4)$$

Training loss 420, also known as Total Training Loss, comprises an averaged summation of the terms described hereinabove, and may be computed or calculated according to Equation (5) below:

$$\mathcal{L}_{total} = w_{aff} \cdot \mathcal{L}_{aff} + w_{sub} \cdot \mathcal{L}_{sub} + w_{div} \cdot \mathcal{L}_{div}, \quad (5)$$

where $W_{aff}$, $W_{sub}$, and $w_{div}$ are weighting factors that are respectively multiplied by affiliation loss 422, sub-action loss 424, and diversity loss 426, and which are adjusted and tuned as part of a hyper-parameters tuning process.

Using a trained embedding network, a support set of trajectories is built by computing or calculating each sub-action representative center for each one of n classes. A query video, which belongs to one of the n classes, is used to compute or calculate a video embedding using the trained model. Classification of the query video is based on a nearest neighbor trajectory using a trajectory distance metric as set forth hereinabove in Equation (1). Base and support sets are trimmed videos which are defined by ground truth annotations 428 in untrimmed videos. Trajectories for each respective support class are calculated in the same manner as the classification task.

Figure 5:
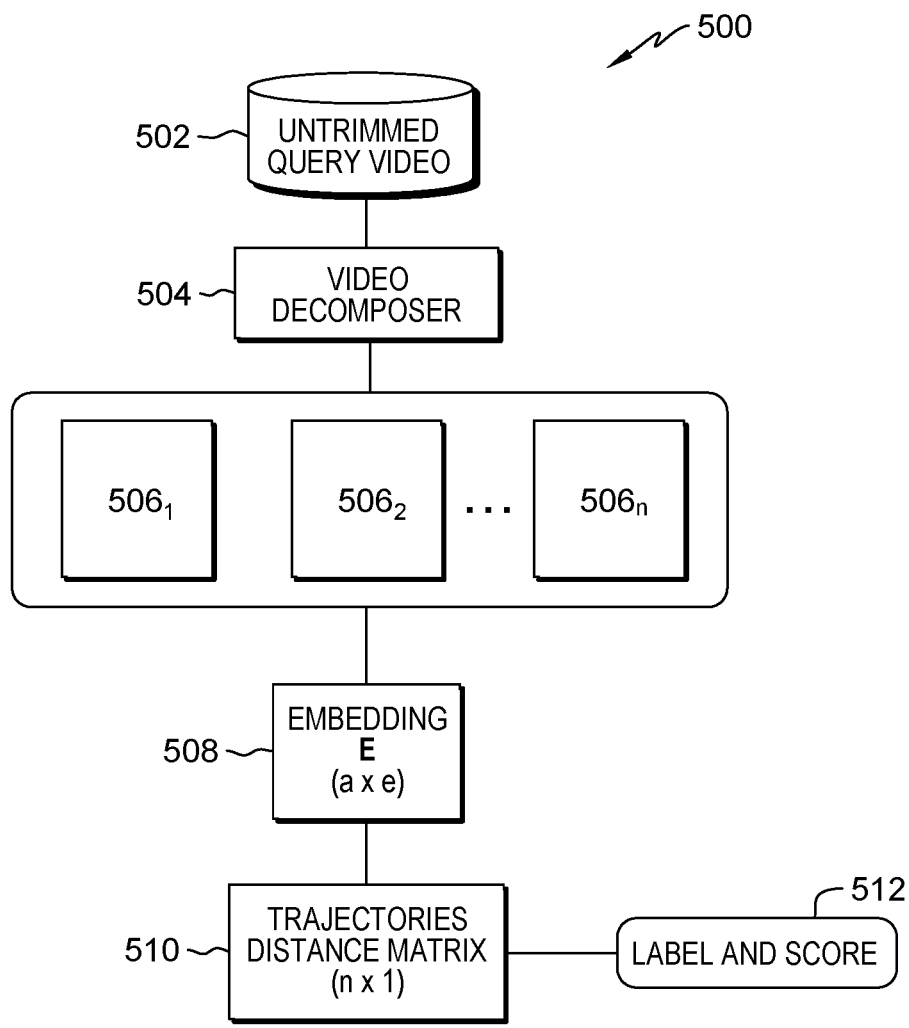
FIG. 5 shows a detection system for untrimmed videos according to illustrative embodiments.

Referring now to FIG. 5, detection process 500 is shown, where a query video is untrimmed video 502, which is decomposed by video decomposer 504 into temporal action proposal segments $506_1$-$506_n$ using a standard temporal action proposal method, in one embodiment using a boundary-matching network. Embedding 508 and trajectories distance matrix 510 are calculated for temporal action proposal segments $506_1$-$506_n$ in a manner similar to that described herein above with respect to FIG. 4. Temporal action proposal segments $506_1$-$506_n$ are then classified and scored according to trajectory similarity in 512. The probability of temporal action proposal segments $506_1$-$506_n$ belonging to an action class c=1, ..., n, i.e. one of the n-way classes, may be computed or calculated according to Equation (6) below:

$$p_i^c = \exp\left(-\frac{d_i^2(E^{(i)}, R^c)}{2\sigma^2}\right), \quad (6)$$

where σ is a hyper-parameter that may control standard deviation of a probability measure. Using the probabilities, the ith action proposal is associated to one of the classes $c_i$, and a score $s_i$ is computed or calculated respectively, according to Equations (7) and (8) below:

$$\hat{c}_i = \underset{c}{\mathrm{argmax}}\, p_i^c \quad (7)$$

$$s_i = p_i^{\hat{c}_i} \quad (8)$$

where s is the score of the $i^{th}$ proposal. Background segments having low confidence scores may be filtered out as background.

Figure 6:
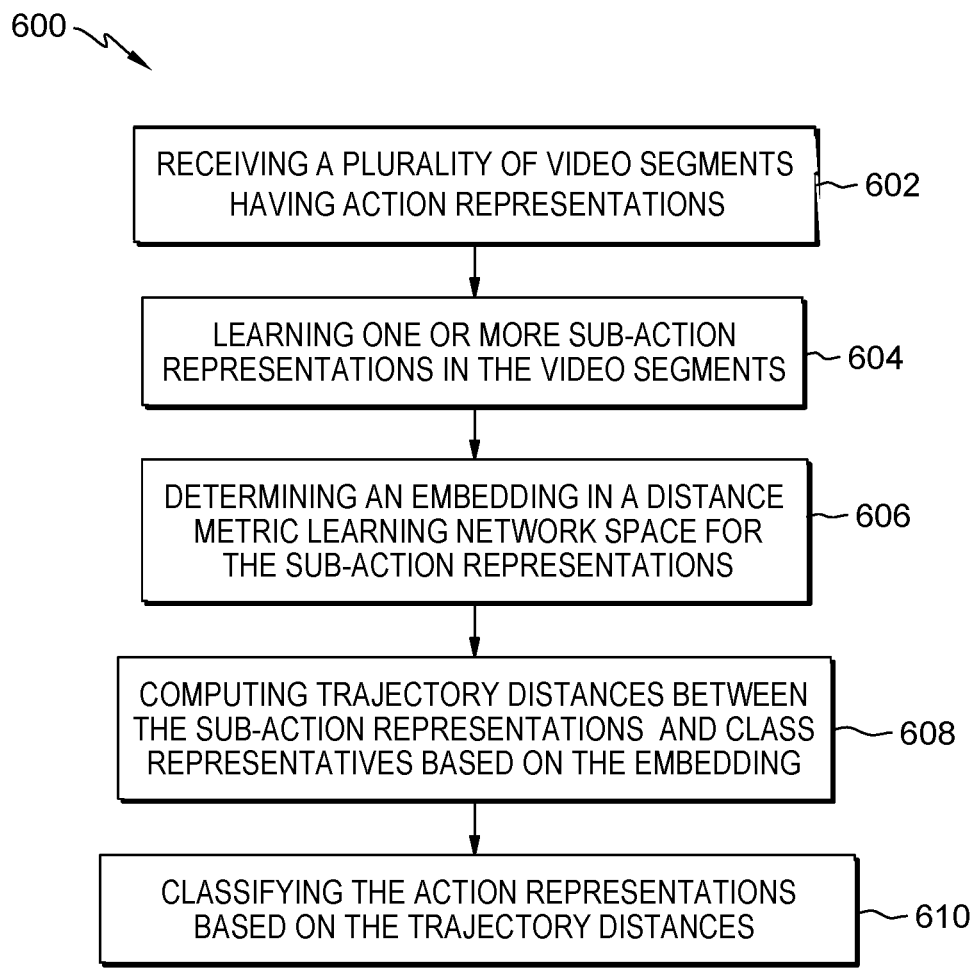
FIG. 6 shows a process flowchart for action recognition according to illustrative embodiments.

Referring now to FIG. 6, in one embodiment, a system (e.g., computer system/server 12 shown in FIG. 1 and FIG. 2) carries out the methodologies disclosed herein. Shown is a process flowchart 600 for action recognition. At 602, a plurality of video segments is received. At 604, one or more sub-action representations in the video segments are learned. At 606, an average feature vector for each of the sub-action representations is computed or calculated. At 608, an embedding in a distance metric learning network space for the average feature vectors is determined. At 610, trajectory distances between the average feature vectors and class representatives based on the embedding are computed or calculated. At 612, the sub-action representations based on the trajectory distances are classified.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for action recognition. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for action recognition. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to action recognition. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for action recognition, the method comprising:
    receiving a plurality of video segments having one or more action representations;
    learning via few-shot learning (FSL) one or more temporal ordered sub-action representations in the plurality of video segments;
    determining an embedding in a space of a distance metric learning (DML) network for each of the one or more sub-action representations;
    computing a set of respective trajectory distances between each of the one or more sub-action representations and one or more class representatives in the space of the DML network based on the embedding;
    classifying the one or more action representations based on the set of respective trajectory distances; and
    producing one or more representative centers that are jointly learned with the one or more sub-action representations comprising producing the one or more representative centers based on one or more available action classes by reshaping output received from an FC layer into only one C class representative for each of the one or more available action classes.

2. The computer-implemented method of claim 1, further comprising training a backbone model using a base set of data, wherein the base set of data comprises convolutional 3D features for action and activity recognition (C3D) data and inflated 3D convolutional neural network (I3D) data.

3. The computer-implemented method of claim 1, further comprising:
    providing a constant scalar value to a fully connected (FC) layer of the DML network, wherein the network has been trained using one or more available action classes.

4. The computer-implemented method of claim 3, wherein the producing one or more representative centers further comprises:
    computing the set of respective trajectory distances between the one or more sub-action representations and the one or more available action classes based on the embedding and the one or more representative centers.

5. The computer-implemented method of claim 3, wherein the DML network comprises a plurality of fully connected layers having rectified linear unit (ReLU) activation functions.

6. The computer-implemented method of claim 3, further comprising computing a total training loss as an averaged summation of an affiliation loss, a sub-action loss, and a diversity loss, wherein the affiliation loss, the sub-action loss, and the diversity loss are each multiplied by a respective weighting factor when the total training loss is computed.

7. The computer-implemented method of claim 6, wherein the affiliation loss minimizes a distance of an embedding video from a representative center, wherein the sub-action loss provides discrimination between one or more sub-actions from one or more action classes, and wherein the diversity loss prevents one or more sub-action representatives from collapsing into a single point in an embedding space.

8. A computer system for action recognition, the computer system comprising:
    a memory medium comprising program instructions;
    a bus coupled to the memory medium; and
    a processor, for executing the program instructions, coupled to an action recognition engine via the bus that when executing the program instructions causes the system to:
        receive a plurality of video segments having one or more action representations;
        learn via few-shot learning (FSL) one or more temporal ordered sub-action representations in the plurality of video segments;
        determine an embedding in a space of a distance metric learning (DML) network for each of the one or more sub-action representations;
        compute a set of respective trajectory distances between each of the one or more sub-action representations and one or more class representatives in the space of the DML network based on the embedding;
        classify the one or more action representations based on the set of respective trajectory distances; and
        produce one or more representative centers that are jointly learned with the one or more sub-action representations comprising producing the one or more representative centers based on one or more available action classes by reshaping output received from an FC layer into only one C class representative for each of the one or more available action classes.

9. The computer system of claim 8, the instructions further causing the system to train a backbone model using a base set of data, wherein the base set of data comprises convolutional 3D features for action and activity recognition (C3D) data and inflated 3D convolutional neural network (I3D) data.

10. The computer system of claim 8, the instructions further causing the system to:
    provide a constant scalar value to a fully connected (FC) layer of the DML network, wherein the network has been trained using one or more available action classes.

11. The computer system of claim 10, wherein the instructions to produce one or more representative centers further comprise instructions to:
    compute the set of respective trajectory distances between the one or more sub-action representations and the one or more available action classes based on the embedding and the one or more representative centers.

12. The computer system of claim 10, wherein the DML network comprises a plurality of fully connected layers having rectified linear unit (ReLU) activation functions.

13. The computer system of claim 10, the instructions further causing the system to compute a total training loss as an averaged summation of an affiliation loss, a sub-action loss, and a diversity loss, wherein the affiliation loss, the sub-action loss, and the diversity loss are each multiplied by a respective weighting factor when the total training loss is computed.

14. The computer system of claim 13, wherein the affiliation loss minimizes a distance of an embedding video from a representative center, wherein the sub-action loss provides discrimination between one or more sub-actions from one or more action classes, and wherein the diversity loss prevents one or more sub-action representatives from collapsing into a single point in an embedding space.

15. A computer program product for action recognition, the computer program product comprising a computer readable hardware storage device, and program instructions stored on the computer readable hardware storage device, to:

receive a plurality of video segments having one or more action representations;

learn via few-shot learning (FSL) one or more temporal ordered sub-action representations in the plurality of video segments;

determine an embedding in a space of a distance metric learning (DML) network for each of the one or more sub-action representations;

compute a set of respective trajectory distances between each of the one or more sub-action representations and one or more class representatives in the space of the DML network based on the embedding;

classify the one or more action representations based on the set of respective trajectory distances; and produce one or more representative centers that are jointly learned with the one or more sub-action representations comprising producing the one or more representative centers based on one or more available action classes by reshaping output received from an FC layer into only one C class representative for each of the one or more available action classes.

16. The computer program product of claim 15, the computer readable hardware storage device further comprising instructions to train a backbone model using a base set of data, wherein the base set of data comprises convolutional 3D features for action and activity recognition (C3D) data and inflated 3D convolutional neural network (I3D) data.

17. The computer program product of claim 15, the computer readable hardware storage device further comprising instructions to:

provide a constant scalar value to a fully connected (FC) layer of the DML network, wherein the network has been trained using one or more available action classes.

18. The computer program product of claim 17, wherein the instructions to produce one or more representative centers further comprise instructions to:

compute the set of respective trajectory distances between the one or more sub-action representations and the one or more available action classes based on the embedding and the one or more representative centers.

19. The computer program product of claim 17, wherein the DML network comprises a plurality of fully connected layers having rectified linear unit (ReLU) activation functions.

20. The computer program product of claim 17, the computer readable hardware storage device further comprising instructions to compute a total training loss as an averaged summation of an affiliation loss, a sub-action loss, and a diversity loss, wherein the affiliation loss, the sub-action loss, and the diversity loss are each multiplied by a respective weighting factor when the total training loss is computed, wherein the affiliation loss minimizes a distance of an embedding video from a representative center, wherein the sub-action loss provides discrimination between one or more sub-actions from one or more action classes, and wherein the diversity loss prevents one or more sub-action representatives from collapsing into a single point in an embedding space.

* * * * *